(No Model.)

G. DIECKMANN.
PISTON FOR ENGINES.

No. 303,602. Patented Aug. 12, 1884.

WITNESSES:
E. Wolff.
Robt H. Roy

INVENTOR
George Dieckmann
BY
Frank v. Briesen
ATTORNEY

UNITED STATES PATENT OFFICE.

GEORGE DIECKMANN, OF NEW YORK, N. Y., ASSIGNOR OF TWO-FIFTHS TO EMMA S. MARSILY, OF SAME PLACE.

PISTON FOR ENGINES.

SPECIFICATION forming part of Letters Patent No. 303,602, dated August 12, 1884.

Application filed April 5, 1884. (No model.) Patented in Belgium May 13, 1884, No. 65,146, and in Turkey May 14, 1884, No. 30.

*To all whom it may concern:*

Be it known that I, GEORGE DIECKMANN, of the city of New York, in the county and State of New York, have invented a new and Improved Piston for Engines, of which the following specification is a full, clear, and exact description.

This invention relates to a new metallic piston for a steam, gas, or air engine which will tighten against the walls of the cylinder in proportion to the amount of pressure upon the piston—that is to say, when the steam or gas pressure is but light, the piston will be contracted, while it will expand laterally and thus bear against the cylinder-walls in proportion to the increase of pressure.

Figure 1:
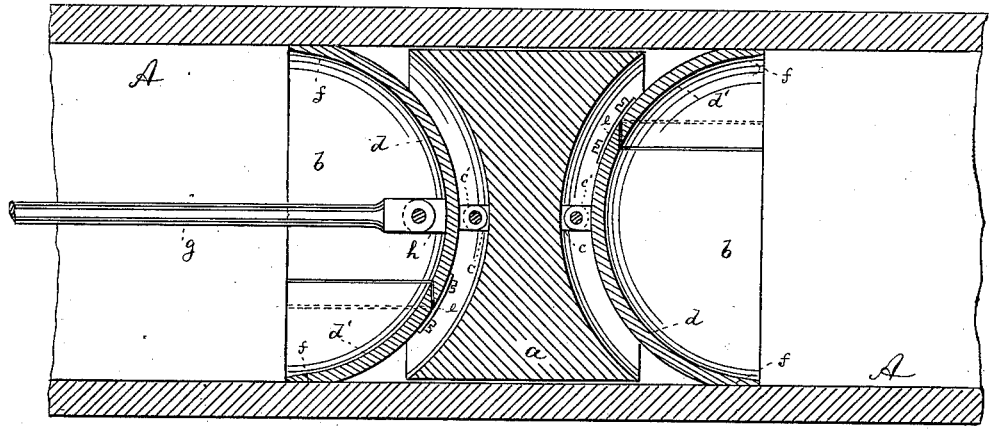
Figure 2:
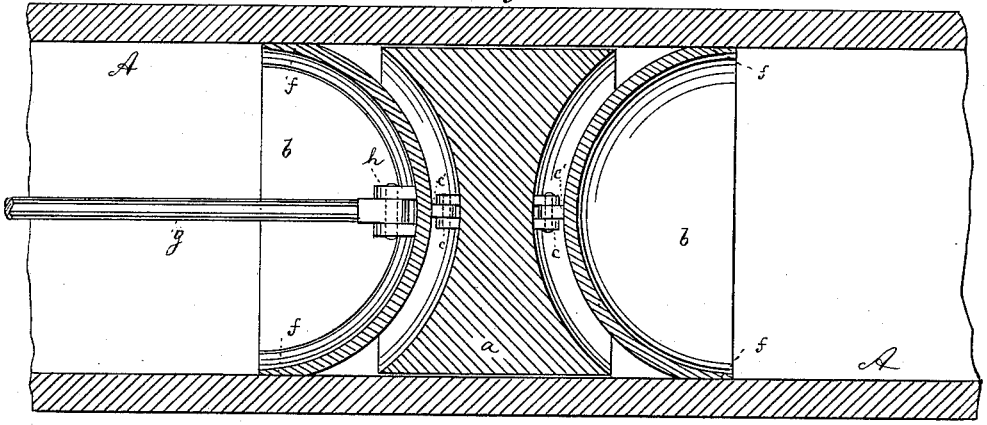
Figure 3:
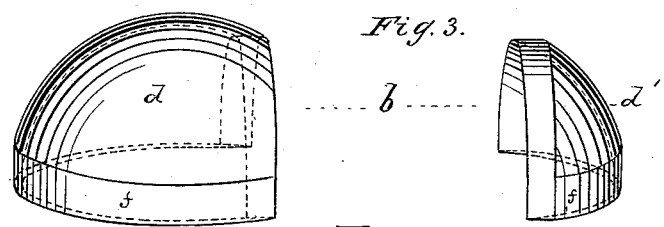
Figure 4:
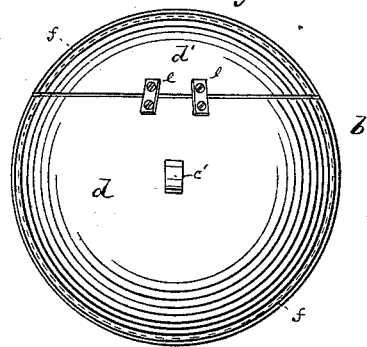

In the accompanying drawings, Figure 1 is a vertical central section of a portion of a cylinder containing my improved piston. Fig. 2 is a similar section taken at right angles to Fig. 1. Fig. 3 is a perspective view of the two parts of one of the tightening-pieces, and Fig. 4 a top view of such tightening-piece.

The letter A represents the cylinder of a steam, air, or gas engine.

The piston is composed, essentially, of a guide-piece, $a$, and of the tightening-pieces $b$ $b$, pivoted thereto, one on each side, by suitable lugs, $c$ $c'$, and a bolt, as shown. The guide-piece $a$ has concave sides, and is of such length as to easily slide within the cylinder.

Each tightening-piece $b$ is made of curved, preferably hemispherical, form, and is composed of two sections, $d$ $d'$, overlapping one another. The joint between the sections $d$ $d'$ is parallel, preferably, to the cylinder-axis, and the overlapping edges are so constructed that when the two sections $d$ $d'$ are put together the upper and lower surfaces of one section will be in line with the upper and lower surfaces of the other section.

$e$ $e$ are elastic bands connecting sections $d$ $d'$. They are preferably made of steel, and attached by rivets or in other suitable manner.

Each tightening-piece $b$ is bounded, as shown, by two concentric curves, the diameter of the inner curve being shorter than the interior diameter of the cylinder A, while the diameter of the outer curve is larger than such diameter. From the line where the outer curve strikes the side of the cylinder A the circumference of the tightening-piece $b$ is made cylindrical, as shown at $f$—that is to say, parallel to the walls of the cylinder. In this way each tightening-piece is made with a taper, $f$, at its open end.

$g$ is the piston-rod, coupled by lugs $h$ and pin to section $d$ of one of the tightening-pieces $b$.

It will be seen that when steam, gas, or compressed air is admitted into the cylinder it will, besides moving the piston up or down, bear laterally against the inner sides of the tightening-pieces, and thus drive them against the cylinder-walls, the elastic bands $e$ permitting a slight turning and consequent spreading of the sections $d$ $d'$. The amount of lateral pressure will be proportionate to the total pressure on the piston, and thus the frictional contact between piston and cylinder will always be proportionate to such total pressure. In this way the frictional contact will be diminished with light pressure and increased with greater pressure.

My piston may be made without the ordinary packing.

I claim as my invention—

1. The combination of guide-piece $a$ with tightening-pieces $b$, composed of overlapping sections, and coupled to the guide-piece, to constitute a piston, substantially as specified.

2. The combination of concave guide-piece $a$, having lug $c$, with curved tightening-piece $b$, having lug $c'$, and composed of overlapping sections $d$ $d'$, substantially as specified.

3. The combination of guide-piece $a$ with the curved tightening-pieces $b$, composed of sections $d$ $d'$, coupled to said guide-piece, and with piston-rod $g$, coupled to section $d$, substantially as herein shown and described.

4. The combination of guide-piece $a$ with curved sectional tightening-piece $b$, elastic bands $e$, and piston-rod $g$, substantially as specified.

5. The combination of guide-piece $a$ with curved tightening-pieces $b$, composed of overlapping sections $d\ d'$, joined by elastic bands $e$, and having cylindrical ends $f$, substantially as specified.

6. As a new article of manufacture, a metallic piston having curved opposite faces and tapering edges, whereby elasticity is imparted thereto, substantially as described.

7. A metallic piston having curved opposite faces and tapering edges, presenting flat or cylindrical surfaces, substantially as described.

GEORGE DIECKMANN.

Witnesses:
F. V. BRIESEN,
ROBT. H. ROY.